(12) United States Patent
Hong et al.

(10) Patent No.: US 12,481,692 B2
(45) Date of Patent: Nov. 25, 2025

(54) METHOD, ELECTRONIC APPARATUS, AND COMPUTER-READABLE STORAGE MEDIUM FOR IDENTIFYING ENTITY RELATIONSHIP PAIRS

(71) Applicant: Beijing Hydrophis Network Technology Co., Ltd., Beijing (CN)

(72) Inventors: Feng Hong, Beijing (CN); Min Huang, Beijing (CN); Weijie Zhou, Beijing (CN); Shanliang Xiong, Beijing (CN); Wenbi Cai, Beijing (CN); Youpeng Wei, Beijing (CN)

(73) Assignee: Beijing Hydrophis Network Technology Co., Ltd., Beijing (CN)

( * ) Notice: Subject to any disclaimer, the term of this patent is extended or adjusted under 35 U.S.C. 154(b) by 0 days.

(21) Appl. No.: 18/599,543

(22) Filed: Mar. 8, 2024

(65) Prior Publication Data
US 2024/0320253 A1    Sep. 26, 2024

(30) Foreign Application Priority Data
Mar. 20, 2023  (CN) .......................... 202310276088.9

(51) Int. Cl.
*G06F 16/353* (2025.01)
*G06F 16/16* (2019.01)
*G06F 16/334* (2025.01)

(52) U.S. Cl.
CPC ........ *G06F 16/353* (2019.01); *G06F 16/3344* (2019.01)

(58) Field of Classification Search
CPC .. G06F 16/353; G06F 16/3344; G06F 16/367; G06F 16/35; G06F 40/295
See application file for complete search history.

(56) References Cited

U.S. PATENT DOCUMENTS

| | | | |
|---|---|---|---|
| 10,346,440 B2 * | 7/2019 | Hanis | G06F 16/245 |
| 10,657,330 B2 * | 5/2020 | Zhang | G06F 40/295 |
| 11,681,874 B2 * | 6/2023 | Brousseau | G06F 40/157 704/9 |
| 11,687,826 B2 * | 6/2023 | Kummamuru | G06N 20/00 706/11 |
| 11,790,171 B2 * | 10/2023 | Vianu | G06V 30/40 704/9 |
| 11,940,986 B1 * | 3/2024 | Kocaman | G06F 16/258 |
| 12,001,441 B2 * | 6/2024 | Chatterjee | G06F 16/26 |
| 2021/0065045 A1 * | 3/2021 | Kummamuru | G06F 16/9038 |

(Continued)

*Primary Examiner* — Debbie M Le

(57) ABSTRACT

The present disclosure discloses a method for identifying entity relationship pairs, including: acquiring a service text set, classifying service texts in the service text set based on text categories of the service texts to obtain a classified text set; performing entity identification and relationship identification on the classified texts in the classified text set to obtain an entity set and a relationship set; constructing a positive example sample set and a negative example sample set based on the entity set and the relationship set; and re-sampling the negative example sample set based on the positive example sample set to obtain a target entity relationship pair. The present disclosure also discloses an electronic device, an electronic apparatus, and a computer readable storage medium for identifying entity relationship pairs. The present disclosure can improve the accuracy of entity relationship identification.

14 Claims, 2 Drawing Sheets

(56) References Cited

U.S. PATENT DOCUMENTS

| | | | |
|---|---|---|---|
| 2021/0110113 A1* | 4/2021 | Brousseau | G06F 40/55 |
| 2021/0216882 A1* | 7/2021 | Huang | G06N 20/00 |
| 2023/0100376 A1* | 3/2023 | Liu | G06F 40/30 |
| | | | 704/9 |
| 2023/0259710 A1* | 8/2023 | Brousseau | G06F 40/157 |
| | | | 704/9 |

* cited by examiner

METHOD, ELECTRONIC APPARATUS, AND COMPUTER-READABLE STORAGE MEDIUM FOR IDENTIFYING ENTITY RELATIONSHIP PAIRS

CROSS REFERENCE TO RELATED APPLICATIONS

The present application claims the benefit of Chinese Patent Application No. 202310276088.9 filed on Mar. 20, 2023, the contents of which are incorporated herein by reference in their entirety.

TECHNICAL FIELD

The present disclosure relates to the field of data processing technology, and more particularly to a method, an electronic apparatus, and a computer-readable storage medium for identifying entity relationship pairs.

BACKGROUND

With the rise of artificial intelligence technology, the data volume in the age of digitalization has grown exponentially, and data mining and relationship mining have become increasingly important.

In the existing technology, based on the artificial intelligence technology, the method of extracting entity information relationships in combination with machine learning methods and rules is gradually maturing, which can effectively help people quickly extract useful and needed information. However, the regular entity identification technology can only perform explicit identification of knowledge entities, without using the large amount of implicit information, resulting in an inaccurate entity relationship identification.

SUMMARY

The present disclosure provides a method, an electronic apparatus, and a computer-readable storage medium for identifying entity relationship pairs, aiming to improve the accuracy of entity relationship identification.

To achieve the above purpose, the method for identifying entity relationship pairs provided in the present disclosure includes:
  acquiring a service text set, classifying service texts in the service text set based on text categories of the service texts to obtain a classified text set;
  performing entity identification and relationship identification on classified texts in the classified text set to obtain an entity set and a relationship set;
  constructing a positive example sample set and a negative example sample set based on the entity set and the relationship set; and
  re-sampling the negative example sample set based on the positive example sample set to obtain a target entity relationship pair.

In an embodiment, the classifying service texts in the service text set based on text categories of the service texts to obtain a classified text set includes:
  traversing the service texts in the service text set and calculating a number of words in each traversed service text;
  when the number of the words meets a preset word threshold, determining the corresponding traversed service text as a short text, and classifying the short text using a pre-built short text classification model;
  when the number of the words does not meet the preset word threshold, determining the corresponding traversed service text as a long text, and classifying the long text using a pre-built long text classification model; and summarizing all the classified service texts to obtain the classified text set.

In an embodiment, the performing entity identification and relationship identification on the classified texts in the classified text set to obtain an entity set and a relationship set includes:
  vectorizing the classified texts in the classified text set using a pre-built BERT model to obtain sentence feature vectors;
  performing entity identification and extraction on the sentence feature vectors using a pre-built entity identification model to obtain the entity set;
  determining a keyword from the classified text based on a preset number of entities in the entity set, and determining a relationship between different numbers of entities based on a preset attribute of the keyword, and summarizing all identified relationships to obtain the relationship set.

In an embodiment, the constructing a positive example sample set and a negative example sample set based on the entity set and the relationship set includes:
  selecting a target relationship from the relationship set, and selecting a target entity pair from the entity set based on the target relationship;
  calculating a similarity score of the target entity pair and the target relationship, and using an entity relationship pair formed by the target entity pair and the target relationship with the similarity score greater than a preset similarity threshold as a positive example sample of the target relationship, and summarizing all the positive example samples to obtain the positive example sample set; and
  using the entity relationship pair formed by target entity pair and the target relationship with the similarity score less than or equal to the preset similarity threshold as a negative example sample of the target relationship, and summarizing all the negative example samples to obtain the negative example sample set.

In an embodiment, the similarity score is calculated by the following formula:

$$\text{Score}(h, t) = \|h + r - t\|_{L_2};$$

wherein, Score(h, t) indicates the similarity score of the target entity pair (h, t), and r indicates the target relationship.

In an embodiment, the re-sampling the negative sample set based on the positive sample set to obtain a target entity relationship pair includes:
  obtaining a correlation relationship of the target relationship in the positive example sample, and replacing the target relationship in the negative example sample corresponding to the positive example sample with the correlation relationship to obtain a replacement entity relationship pair;
  calculating a similarity score of the replacement entity relationship pair, and using the replacement entity relationship pair with the similarity score greater than the preset similarity threshold as a positive example sample of the correlation relationship;

using all the positive examples as the target entity relationship pair.

In an embodiment, after the using the replacement entity relationship pair with the similarity score greater than the preset similarity threshold as a positive example sample of the correlation relationship, the method further includes:

using the replacement entity relationship pair with the similarity score less than or equal to the preset similarity threshold as a negative example sample of the correlation relationship, and re-sampling the negative example sample of the correlation relationship using the positive example sample of the correlation relationship.

The present disclosure further provides an electronic device for identifying entity relationship pairs, wherein the electronic device includes:

a text classification module, configured to acquire a service text set, classifying service texts in the service text set based on text categories of the service texts to obtain a classified text set;

an entity relationship identification module, configured to perform entity identification and relationship identification on the classified texts in the classified text set to obtain an entity set and a relationship set;

a sample construction module, configured to construct a positive sample set and a negative sample set based on the entity set and the relationship set; and an entity relationship pair extraction module, configured to re-sample the negative example sample set based on the positive example sample set to obtain a target entity relationship pair.

The present disclosure further provides an electronic apparatus, including:

at least one processor; and, a memory in communication with the at least one processor, wherein the memory stores a computer program executable on the at least one processor, and the computer program is executed by the at least one processor to enable the at least one processor to implement the above method for identifying entity relationship pairs.

The present disclosure further provides a non-transitory computer-readable storage medium storing a computer program, which, when being executed by a processor, implements the above method for identifying entity relationship pairs.

In the embodiment of the present disclosure, the service texts in the service text set are classified to obtain the classified text set, entity identification and relationship identification are performed on the classified texts in the classified text set to obtain the entity set and the relationship set, the positive example sample set and the negative example sample set are constructed based on the entity set and the relationship set, and the negative example sample set is re-sampled based on the positive example sample set to obtain the target entity relationship pair. Therefore, the entity relationships of triples can be continuously and deeply mined, and the implicit information of the entities can be fully utilized, improving the accuracy of entity relationship identification. Therefore, the method, electronic apparatus, and computer-readable storage medium for identifying entity relationship pairs provided in the present disclosure can improve the accuracy of entity relationship identification.

Figure 1:
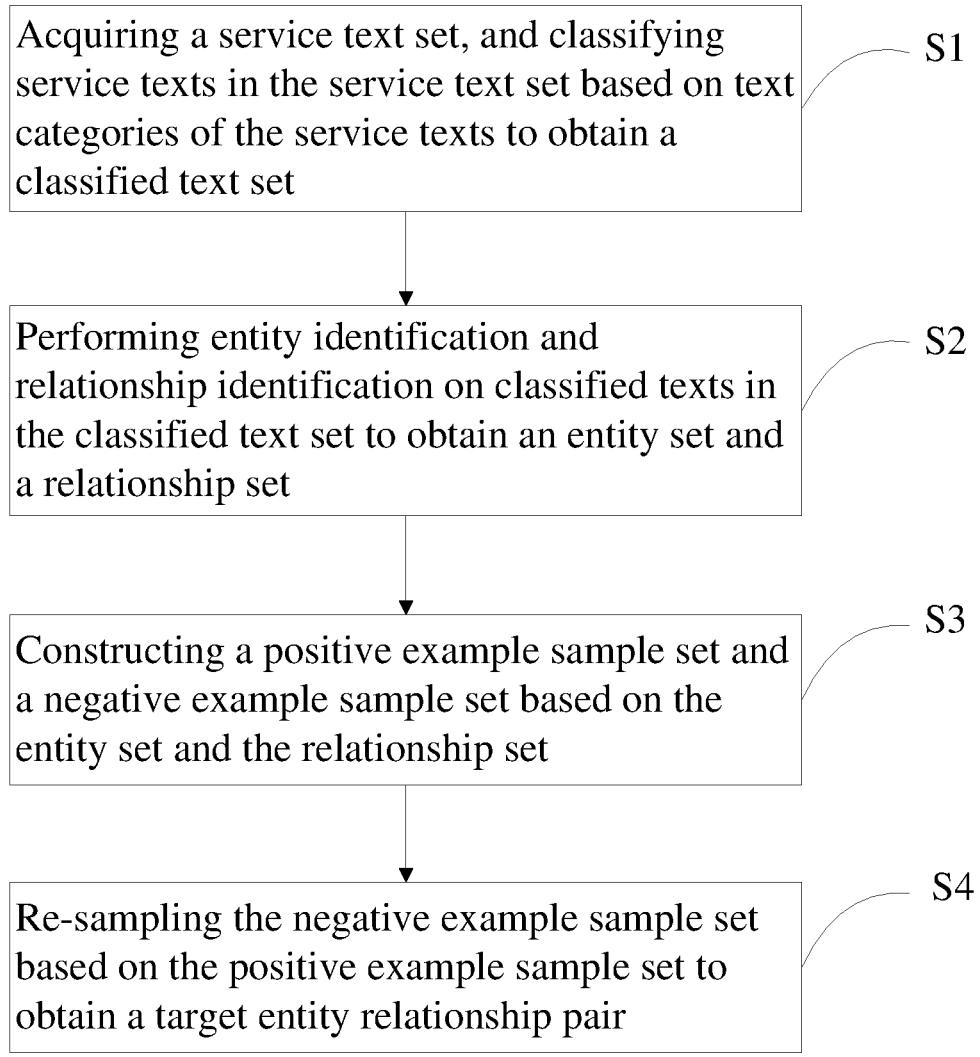
FIG. 1 is a flow diagram of a method for identifying entity relationship pairs in accordance with an embodiment of the present disclosure.

The realization of the objectives, functional features, and advantages of the present disclosure will be further explained with reference to the accompanying drawings in conjunction with the embodiments.

DETAILED DESCRIPTION OF THE EMBODIMENTS

In the following, the technical solutions in the embodiments of the present disclosure will be clearly and completely described with reference to the drawings in the embodiments of the present disclosure. Obviously, the described embodiments may be only a part of the embodiments of the present disclosure, but not all of the embodiments. Based on the embodiments of the present disclosure, all other embodiments obtained by those of ordinary skilled in the art without creative effort shall fall within the protection scope of the present disclosure.

It is to be understood that, all of the directional instructions in the exemplary embodiments of the present disclosure (such as top, down, left, right, front, back . . . ) can only be used for explaining relative position relations, moving condition of the elements under a form (referring to figures), and so on, if the form changes, the directional instructions changes accordingly.

In addition, descriptions such as "first" and "second" in the present disclosure may be for descriptive purposes only, and cannot be understood as indicating or implying the relative importance or implicitly indicating the number of indicated technical features. Therefore, the features defined as "first" and "second" may explicitly or implicitly include at least one of the features. In addition, the meaning of "and/or" appearing in the context means including three parallel solutions, using "A and/or B" as an example, "A and/or B" includes only solution A, or only solution B, or both solutions A and B. In addition, the technical solutions among the various embodiments can be combined with each other, but the combinations must be based on what can be achieved by those of ordinary skill in the art. When a combination of technical solutions is contradictory or cannot be achieved, it should be considered that such a combination of technical solutions does not exist and is not within the protection scope claimed by the present application.

The embodiments of the present disclosure provide a method for identifying entity relationship pairs. The method for identifying entity relationship pairs can be executed, but is not limited to, at least one of electronic devices such as servers and terminals that are configured to execute the method provided by the embodiments of the present disclosure. In other words, the method for identifying entity relationship pairs can be executed by software or hardware installed on terminal devices or server devices. The software can be a blockchain platform. The server includes, but is not limited to, a single server, a server cluster, a cloud server, or a cloud server cluster. The server can be an independent server, or a cloud server that provides basic cloud computing services such as cloud services, cloud databases, cloud computing, cloud functions, cloud storage, network services, cloud communication, middleware services, domain name services, security services, content delivery networks (CDNs), and big data and artificial intelligence platforms.

Referring to FIG. 1, which is a flow diagram of a method for identifying entity relationship pairs in accordance with an embodiment of the present disclosure. In this embodiment, the method includes steps as follows.

S1, acquiring a service text set, and classifying service texts in the service text set based on text categories of the service texts to obtain a classified text set.

In the embodiment of the present disclosure, the service text set can include service texts crawled from different fields, such as enterprise evaluation reports, enterprise equity data, and user resumes. Due to different lengths of different service texts and different classification methods of different service texts, the accuracy and efficiency of the text classification can be improved by classifying the service texts of different text categories based on the text categories of the service texts.

In detail, the classifying service texts in the service text set based on text categories of the service texts to obtain a classified text set includes:

- traversing the service texts in the service text set and calculating the number of words in each traversed service text;
- when the number of the words of a traversed service text meets a preset word threshold, determining the corresponding traversed service text as a short text, and classifying the short text using a pre-built short text classification model;
- when the number of words of a traversed service text does not meet the preset word threshold, determining the corresponding traversed service text as a long text, and classifying the long text using a pre-built long text classification model; and
- summarizing all the classified service texts to obtain the classified text set.

In an embodiment of the present disclosure, the text classification model can be a pre-trained natural language model, for example, the short text classification model can be s TextCNN model, and the long text classification model can be a FastText model, a HAN model, a XLNet model, etc. For example, the word threshold can be 1000. When the number of the words in a service text is less than 1000, the service text is a short text and is classified by a TextCNN model. When the number of the words in a service text is greater than or equal to 1000, the service text is a long text and is classified by a XLNet model.

S2, performing entity identification and relationship identification on classified texts in the classified text set to obtain an entity set and a relationship set, which includes

- vectorizing the classified texts in the classified text set using a pre-built BERT model to obtain sentence feature vectors;
- performing entity identification and extraction on the sentence feature vectors using a pre-built BERT model to obtain the entity set; and
- determining a keyword from the classified text based on a preset number of entities in the entity set, and determining a relationship between different numbers of entities based on a preset attribute of the keyword, and summarizing all identified relationships to obtain the relationship set.

In an embodiment of the present disclosure, after the embedding of the BERT model, the sentence feature vectors are obtained and combined with the part-of-speech features of the Jieba segmentation words to form the input of the model. The entity extraction is implemented through the Bi-LSTM+CRF model structure (entity identification model). At the same time, the relationship between two entities appearing in the same sentence can be identified. For example, for a sentence "A works in the B company", the entities are "A" and "B company", and the keyword is "work", with the corresponding preset attribute being "employee". The corresponding relationship is determined to be "employee".

S3, constructing a positive example sample set and a negative example sample set based on the entity set and the relationship set.

In the embodiment of the present disclosure, the positive example sample represents the triplet with a high matching degree between the entity and the relationship, while the negative example sample represents the triplet with a low matching degree between the entity and the relationship.

In detail, the constructing the positive sample set and the negative sample set based on the entity set and the relationship set includes:

- selecting a target relationship from the relationship set, and selecting a target entity pair from the entity set based on the target relationship;
- calculating a similarity score of the target entity pair and the target relationship, and using an entity relationship pair formed by the target entity pair and the target relationship with the similarity score greater than a preset similarity threshold as a positive example sample of the target relationship, and summarizing all the positive example samples to obtain the positive example sample set;
- using the entity relationship pair formed by the target entity pair and the target relationship with the similarity scoreless than the preset similarity threshold as a negative example sample of the target relationship, and summarizing all the negative example samples to obtain the negative example sample set.

In an embodiment of the present disclosure, the similarity score is calculated by the following formula:

$$\text{Score}(h, t) = \|h + r - t\|_{L_2};$$

Wherein, Score(h, t) indicates the similarity score of the target entity pair (h, t), and r indicates the target relationship.

In an embodiment of the present disclosure, the positive example sample indicates that the entity and relationship are embedded into the entity relationship pair of the same vector relationship based on the principle of $\|h+r-t\|$, and the negative example samples indicates that the entity and relationship cannot be embedded into the entity relationship pair of the same vector relationship.

S4, re-sampling the negative example sample set based on the positive example sample set to obtain a target entity relationship pair.

In the embodiment of the present disclosure, for a certain target relationship (such as "colleague relationship"), although the positive example sample is a high-quality knowledge triplet (entity relationship pair), the negative example sample also contains a large amount of information that has not been mined (such as "superior-subordinate relationship"). The relationship between the entities in the triplet can be further mined by re-sampling the negative example sample with the positive example sample, improving the depth and accuracy of the entity relationship pair identification.

In an embodiment, the re-sampling the negative example sample set based on the positive example sample set to obtain a target entity relationship pair includes:
  obtaining a correlation relationship of the target relationship in the positive example sample, and replacing the target relationship in the negative example sample corresponding to the positive example sample with the correlation relationship to obtain a replacement entity relationship pair;
  calculating a similarity score of the replacement entity relationship pair, and using the replacement entity relationship pair with the similarity score greater than a preset similarity threshold as a positive example sample of the correlation relationship; and
  using all the positive examples as the target entity relationship pair.

In another embodiment of the present disclosure, after using the replacement entity relationship pair with the similarity score greater than a preset similarity threshold as a positive example sample of the correlation relationship, the method further includes:
  using the replacement entity relationship pair with the similarity score less than or equal to the preset similarity threshold as a negative example sample of the correlation relationship, and re-sampling the negative example sample of the correlation relationship using the positive example sample of the correlation relationship.

In the embodiment of the present disclosure, for example, for the identification of entity relationships among all employees in a company, the target relationship is "finance". After all relevant employee entities and department entities are determined, corresponding entities can be continuously obtained from the negative example samples according to the correlation relationship "sales", thereby further mining knowledge triples.

In the embodiment of the present disclosure, the step of re-sampling the negative example sample of the correlation relationship using the positive example sample of the correlation relationship is similar to the steps of constructing the positive example sample set and negative example sample set based on the target relationship in S3-S4, which is not repeated here.

In the embodiment of the present disclosure, the service texts in the service text set are classified to obtain the classified text set, entity identification and relationship identification are performed on the classified texts in the classified text set to obtain the entity set and the relationship set, the positive example sample set and the negative example sample set are constructed based on the entity set and the relationship set, and the negative example sample set is re-sampled based on the positive example sample set to obtain the target entity relationship pair. Therefore, the entity relationships of triples can be continuously and deeply mined, and the implicit information of the entities can be fully utilized, improving the accuracy of entity relationship identification. Therefore, the method, electronic apparatus, and computer-readable storage medium for identifying entity relationship pairs provided in the present disclosure can improve the accuracy of entity relationship identification.

Figure 2:
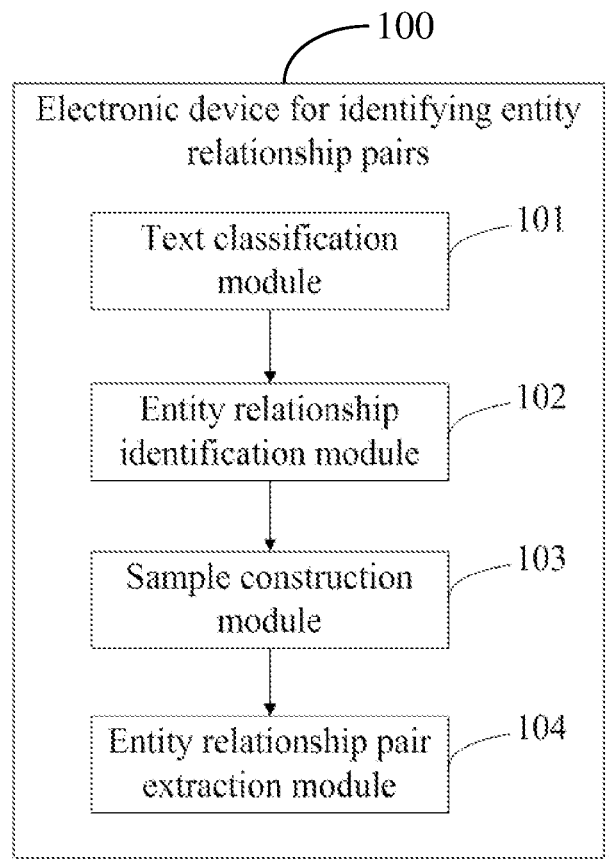
FIG. 2 is a functional block diagram of an electronic device apparatus for identifying entity relationship pairs in accordance with an embodiment of the present disclosure.

As shown in FIG. 2, which is a functional module diagram of an electronic device 100 for identifying entity relationship pairs in accordance with an embodiment of the present disclosure.

The electronic device 100 described in the present disclosure can be installed in an electronic apparatus. According to functions implemented by the electronic device 100, the electronic device 100 may include a text classification module 101, an entity relationship identification module 102, a sample construction module 103, and an entity relationship pair extraction module 104. The modules described in the present disclosure can also be referred to as units, which refer to a series of computer program segments that are stored in a memory of an electronic device and can be executed by a processor of the electronic device to complete fixed functions.

The text classification module 101 is configured to obtain a service text set, and classify service texts in the service text set based on text categories of the service texts to obtain a classified text set.

The entity relationship identification module 102 is configured to perform entity identification and relationship identification on classified texts in the classified text set to obtain an entity set and a relationship set.

The sample construction module 103 is configured to construct a positive sample set and a negative sample set based on the entity set and the relationship set.

The entity relationship pair extraction module 104 is configured to re-sample the negative example sample set based on the positive example sample set to obtain a target entity relationship pair.

In an embodiment, the text classification module 101 obtains the service text set, and classifies the service texts in the service text set based on the text categories of the service texts to obtain the classified text set.

In the embodiment of the present disclosure, the service text set can include service texts crawled from different fields, such as enterprise evaluation reports, enterprise equity data, and user resumes. Due to different lengths of different service texts and different classification methods of different service texts, the accuracy and efficiency of the text classification can be improved by classifying the service texts of different text categories based on the text categories of the service texts.

In an embodiment, the text classification module 101 is configured to:
  traverse the service texts in the service text set and calculating the number of words in each traversed service text;
  when the number of the words of a traversed service text meets a preset word threshold, determine the corresponding traversed service text as a short text, and classify the short text using a pre-built short text classification model;
  when the number of words of a traversed service text does not meet the preset word threshold, determine the corresponding traversed service text as a long text, and classifying the long text using a pre-built long text classification model; and
  summarize all the classified service texts to obtain the classified text set.

In an embodiment of the present disclosure, the text classification model can be a pre-trained natural language model, for example, the short text classification model can be s TextCNN model, and the long text classification model can be a FastText model, a HAN model, a XLNet model, etc. For example, the word threshold can be 1000. When the number of the words in a service text is less than 1000, the service text is a short text and is classified by a TextCNN model. When the number of the words in a service text is greater than or equal to 1000, the service text is a long text and is classified by a XLNet model.

The entity relationship identification module 102 performs entity identification and relationship identification on the classified texts in the classified text set to obtain the entity set and the relationship set.

In an embodiment, the entity relationship identification module 102 is configured to:
vectorize the classified texts in the classified text set using a pre-built BERT model to obtain sentence feature vectors;
perform entity identification and extraction on the sentence feature vectors using a pre-built BERT model to obtain the entity set; and
determine a keyword from the classified text based on a preset number of entities in the entity set, and determine a relationship between different numbers of entities based on a preset attribute of the keyword, summarize all identified relationships to obtain the relationship set.

In an embodiment of the present disclosure, after the embedding of the BERT model, the sentence feature vectors are obtained and combined with the part-of-speech features of the Jieba segmentation words to form the input of the model. The task of entity extraction is implemented through the Bi-LSTM+CRF model structure (entity identification model). At the same time, the relationship between two entities appearing in the same sentence can be identified. For example, for a sentence "A works in the B company", the entities are "A" and "B company", and the keyword is "work", with the corresponding preset attribute being "employee". The corresponding relationship is determined to be "employee".

The sample construction module 103 constructs the positive sample set and the negative sample set based on the entity set and the relationship set.

In the embodiment of the present disclosure, the positive example sample represents the triplet with a high matching degree between the entity and the relationship, while the negative example sample represents the triplet with a low matching degree between the entity and the relationship.

In detail, the sample construction module 103 is configured to:
select a target relationship from the relationship set, and selecting a target entity pair from the entity set based on the target relationship;
calculate a similarity score of the target entity pair and the target relationship, and use an entity relationship pair formed by the target entity pair and the target relationship with the similarity score greater than a preset similarity threshold as a positive example sample of the target relationship, and summarize all the positive example samples to obtain the positive example sample set;
use the entity relationship pair formed by the target entity pair and the target relationship with the similarity score less than the preset similarity threshold as a negative example sample of the target relationship, and summarize all the negative example samples to obtain the negative example sample set.

In an embodiment of the present disclosure, the sample construction module 103 calculates the similarity score using the following formula:

$$\text{Score}(h, t) = \|h + r - t\|_{L_2};$$

Wherein, Score(h, t) indicates the similarity score of the target entity pair (h, t), and r indicates the target relationship.

In an embodiment of the present disclosure, the positive example sample indicates that the entity and relationship are embedded into the entity relationship pair of the same vector relationship based on the principle of $\|h+r-t\|$, and the negative example samples indicates that the entity and relationship cannot be embedded into the entity relationship pair of the same vector relationship.

The entity relationship pair extraction module 104 re-samples the negative example sample set based on the positive example sample set to obtain a target entity relationship pair.

In the embodiment of the present disclosure, for a certain target relationship (such as "colleague relationship"), although the positive example sample is a high-quality knowledge triplet (entity relationship pair), the negative example sample also contains a large amount of information that has not been mined (such as "superior-subordinate relationship"). The relationship between the entities in the triplet can be further mined by re-sampling the negative example sample with the positive example sample, improving the depth and accuracy of the entity relationship pair identification.

In an embodiment, the entity relationship pair extraction module 104 is configured to:
obtain a correlation relationship of the target relationship in the positive example sample, and replace the target relationship in the negative example sample corresponding to the positive example sample with the correlation relationship to obtain a replacement entity relationship pair;
calculate a similarity score of the replacement entity relationship pair, and use the replacement entity relationship pair with the similarity score greater than a preset similarity threshold as a positive example sample of the correlation relationship; and
use all the positive examples as the target entity relationship pair.

In another embodiment of the present disclosure, after the replacement entity relationship pair with the similarity score greater than the preset similarity threshold is used as a positive example sample for the correlation relationship, the entity relationship pair extraction module 104 is further configured to:
use the replacement entity relationship pair with the similarity score less than or equal to the preset similarity threshold as a negative example sample of the correlation relationship, and re-sample the negative example sample of the correlation relationship using the positive example sample of the correlation relationship.

In the embodiment of the present disclosure, for example, for the identification of entity relationships among all employees in a company, the target relationship is "finance". After all relevant employee entities and department entities are determined, corresponding entities can be continuously obtained from the negative example samples according to the correlation relationship "sales", thereby further mining knowledge triples.

In the embodiment of the present disclosure, the process of re-sampling the negative example sample of the correlation relationship using the positive example samples of the correlation relationship is similar to the process of constructing the positive example sample set and negative example sample set based on the target relationship implemented by the sample construction module 103 and the entity relationship pair extraction module 104, which is not repeated here.

In the embodiment of the present disclosure, the service texts in the service text set are classified to obtain the classified text set, entity identification and relationship identification are performed on the classified texts in the classified text set to obtain the entity set and the relationship set, the positive example sample set and the negative example sample set are constructed based on the entity set and the relationship set, and the negative example sample set is re-sampled based on the positive example sample set to obtain the target entity relationship pair. Therefore, the entity relationships of triples can be continuously and deeply mined, and the implicit information of the entities can be fully utilized, improving the accuracy of entity relationship identification. Therefore, the method, electronic apparatus, and computer-readable storage medium for identifying entity relationship pairs provided in the present disclosure can improve the accuracy of entity relationship identification.

Figure 3:
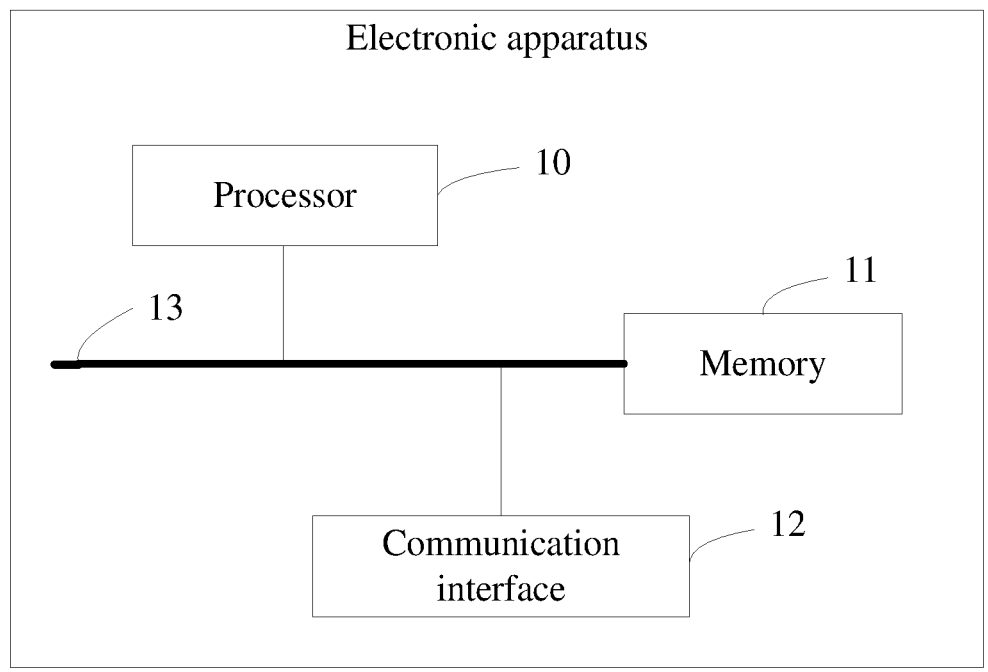
FIG. 3 is a structural diagram of an electronic apparatus for implementing the method for identifying entity relationship pairs in accordance with an embodiment of the present disclosure.

As shown in FIG. 3, which is a structural diagram of an electronic apparatus for implementing the method for identifying entity relationship pairs in accordance with an embodiment of the present disclosure.

The electronic apparatus may include a processor 10, a memory 11, a communication interface 12, and a bus 13. The electronic apparatus may also include computer programs stored in the memory 11 and executable on the processor 10, such as a program for identifying entity relationship pairs.

The memory 11 includes at least one type of readable storage medium, which includes a flash memory, a removable hard disk, a multimedia card, a card-type storage (such as SD or DX storage), a magnetic storage, a magnetic disk, and an optical disk. In some embodiments, the memory 11 can be an internal storage unit of the electronic apparatus, such as the removable hard disk of the electronic device. In other embodiments, the memory 11 can also be an external storage device of the electronic apparatus, such as a plug-in removable hard disk, a smart media card (SMC), a secure digital (SD) card, and a flash card. The memory 11 can also include both the internal storage unit and the external storage device of the electronic apparatus. The memory 11 can be used not only to store application software and various data installed in the electronic apparatus, such as codes of the program for identifying entity relationship pairs, but also to temporarily store data that has been output or will be output.

The processor 10 may be composed of integrated circuits. For example, the processor 10 may be composed of a single integrated circuit, or may be composed of multiple integrated circuits of the same function or different functions. The processor 10 may include one or more central processing units (CPU), a microprocessor, a digital processing chip, a graphics processor, or a combination of various control chips. The processor 10 is the control unit of the electronic apparatus, which connects various components of the entire electronic apparatus using various interfaces and lines, and executes various functions and processes data by running or executing programs or modules (such as the program for identifying entity relationship pairs) stored in the memory 11, and invoking data stored in the memory 11.

The communication interface 12 is used for communication between the electronic apparatus and other devices, including network interfaces and user interfaces. Optionally, the network interfaces can include wired interfaces and/or wireless interfaces (such as WI-FI interfaces and Bluetooth interfaces), which are usually used to establish communication connections between the electronic apparatus and other electronic devices. The user interface can be a display, an input unit (such as a keyboard); optionally, the user interface can also be a standard wired interface or a wireless interface. In some embodiments, the display can be a light emitting diode (LED) display, a liquid crystal display, a touch-sensitive liquid crystal display, and a organic light emitting diode (OLED) touch screen. In this disclosure, the display can also be appropriately termed as a display screen or a display unit, which is used for displaying information processed in the electronic apparatus, and displaying a visual user interface.

The bus 13 may be a peripheral component interconnect (PCI) bus or an extended industry standard architecture (EISA) bus. The bus 13 can include an address bus, a data bus, a control bus, etc. The bus 13 is configured to realize the connection and communication between the memory 11 and at least one processor 10.

FIG. 3 only shows the electronic apparatus with some components. Those skilled in the art can understand that the structure shown in FIG. 3 does not constitute a limitation on the electronic apparatus, and the electronic apparatus can include fewer or more components than those shown, or a combination of some components, or have different component arrangements.

For example, although not shown, the electronic apparatus may also include a power supply (such as a battery) that supplies power to various components. In some embodiments, the power supply may be logically connected to the at least one processor 10 through a power management device, thereby enabling charging management, discharging management, and power consumption management functions through the power management device. The power supply may also include one or more DC or AC power supplies, recharging devices, power failure detection circuits, power converters or inverters, power status indicators, and any other components. The electronic apparatus may also include various sensors, Bluetooth modules, Wi-Fi modules, etc., which is not further described here.

Furthermore, the electronic apparatus may also include a network interface, optionally including a wired interface and/or a wireless interface (such as a WI-FI interface, a Bluetooth interface, etc.), typically used to establish a communication connection between the electronic device and other electronic devices.

In some embodiments, the electronic device may also include a user interface, which may be a display, an input unit (such as a keyboard); optionally, the user interface can also be a standard wired interface or a wireless interface. In some embodiments, the display can be an LED display, a liquid crystal display, a touch-sensitive liquid crystal display, and an OLED touch screen. In this disclosure, the display can also be appropriately termed as a display screen or a display unit, which is used for displaying information processed in the electronic apparatus, and displaying a visual user interface.

It should be understood that the embodiments described are for illustrative purposes only and are not limited by this structure in the scope of the present disclosure.

The program for identifying entity relationship pairs stored in the memory 11 of the electronic apparatus is a combination of multiple instructions, which, when being executed in the processor 10 can achieve:

acquiring a service text set, classifying service texts in the service text set based on text categories of the service texts to obtain a classified text set;

performing entity identification and relationship identification on classified texts in the classified text set to obtain an entity set and a relationship set;

constructing a positive example sample set and a negative example sample set based on the entity set and the relationship set; and re-sampling the negative example sample set based on the positive example sample set to obtain a target entity relationship pair.

In an embodiment, the specific implementation method of the processor 10 for the above instructions can be referred to the description of the relevant steps in the corresponding embodiments of the accompanying drawings, which is not repeated here.

Further, if the module/unit integrated into the electronic apparatus is implemented in the form of a software functional unit and sold or used as an independent product, it can be stored in a computer-readable storage medium. The computer-readable storage medium can be volatile or non-volatile. For example, the computer-readable medium can include any entity or device capable of carrying the computer program code, recording medium, U disk, mobile hard disk, magnetic disk, optical disk, computer memory, read-only memory (ROM).

The present disclosure also provides a computer-readable storage medium storing a computer program, which, when being executed by a processor of an electronic device, can implement:

acquiring a service text set, classifying service texts in the service text set based on text categories of the service texts to obtain a classified text set;

performing entity identification and relationship identification on classified texts in the classified text set to obtain an entity set and a relationship set;

constructing a positive example sample set and a negative example sample set based on the entity set and the relationship set; and re-sampling the negative example sample set based on the positive example sample set to obtain a target entity relationship pair.

In the several embodiments provided by the present disclosure, it should be understood that the disclosed apparatus, device and method can be implemented in other ways. For example, the embodiments of the electronic device described above are only illustrative. For example, the division of modules is only a logical function division, and there may be other division methods in actual implementation.

The modules described as separate components may or may not be physically separated, and the components displayed as modules may or may not be physical units, that is, the components may be located in one place or distributed across multiple network units. Some or all of the modules can be selected according to actual needs to achieve the objectives of this embodiment.

Additionally, various functional modules described in the embodiments herein may be integrated into one processing unit or may be present as a number of physically separated units, and two or more units may be integrated into one. The above integrated units may be implemented by hardware or by hardware in combination with software functional modules.

It will be appreciated that the foregoing embodiments are merely illustrative of the technical solutions of this disclosure and are not restrictive. Various modifications, changes, or equivalent substitutions can be made to the disclosure without departing from the spirit and scope of the technical solutions of the disclosure.

Therefore, from any point of view, the foregoing embodiments are to be regarded in all respects as illustrative and not restrictive, and the scope of the disclosure is defined by the appended claims rather than by the foregoing description. The present disclosure is therefore intended to embrace all changes that fall within the meanings and ranges of the equivalent elements of the claims. No reference sign shown in the accompanying drawings that are recited in a claim should be considered as a restriction on the claim involved.

The embodiments of the present disclosure can acquire and process relevant data based on artificial intelligence (AI) technology. Wherein, AI is a theory, method, technology, and application system that uses digital computers or machines controlled by digital computers to simulate, extend, and expand human intelligence, perceive the environment, acquire knowledge, and use knowledge to obtain the best results.

The basic AI technologies generally include sensors, dedicated AI chips, cloud computing, distributed storage, big data processing technology, operation/interaction systems, and mechatronics. AI software technology mainly includes computer vision technology, robotics, biometrics, speech processing technology, natural language processing technology, and machine learning/deep learning.

In addition, it is manifest that the term "comprising," or "including," does not exclude other elements or steps, and the singular form does not exclude the plural. A plurality of units or devices recited in the system claims may also be implemented by one unit or device through software or hardware. Terms such as "first," "second," (if any) are used to indicate names rather than any particular order.

Finally, it should be noted that the above embodiments are only used to illustrate the technical solutions of the present disclosure and do not limit the scope of the patents of the present disclosure. Although the present disclosure has been described in detail with reference to preferred embodiments, those skilled in the art should understand that the technical solutions of the present disclosure can be modified or equivalently replaced without departing from the spirit and scope of the technical solutions of the present disclosure.

What is claimed is:

1. A method for identifying entity relationship pairs, wherein the method comprises:

acquiring a service text set, classifying service texts in the service text set based on text categories of the service texts to obtain a classified text set;

performing entity identification and relationship identification on classified texts in the classified text set to obtain an entity set and a relationship set;

constructing a positive example sample set and a negative example sample set based on the entity set and the relationship set; and re-sampling the negative example sample set based on the positive example sample set to obtain a target entity relationship pair;

wherein the classifying service texts in the service text set based on text categories of the service texts to obtain a classified text set comprises:

traversing the service texts in the service text set and calculating a number of words in each traversed service text;

when the number of the words meets a preset word threshold, determining the corresponding traversed service text as a short text, and classifying the short text using a pre-built short text classification model;

when the number of the words does not meet the preset word threshold, determining the corresponding traversed service text as a long text, and classifying the long text using a pre-built long text classification model; and summarizing all the classified service texts to obtain the classified text set wherein the performing entity identification and relationship identification on the classified texts in the classified text set to obtain an entity set and a relationship set comprises:

vectorizing the classified texts in the classified text set using a pre-built BERT model to obtain sentence feature vectors;

performing entity identification and extraction on the sentence feature vectors using a pre-built entity identification model to obtain the entity set;

determining a keyword from the classified texts based on a preset number of entities in the entity set, and determining a relationship between different numbers of entities based on a preset attribute of the keyword, and summarizing all identified relationships to obtain the relationship set.

2. The method according to claim 1, wherein the constructing a positive example sample set and a negative example sample set based on the entity set and the relationship set comprises:

selecting a target relationship from the relationship set, and selecting a target entity pair from the entity set based on the target relationship;

calculating a similarity score of the target entity pair and the target relationship, and using an entity relationship pair formed by the target entity pair and the target relationship with the similarity score greater than a preset similarity threshold as a positive example sample of the target relationship, and summarizing all the positive example samples to obtain the positive example sample set; and using the entity relationship pair formed by target entity pair and the target relationship with the similarity score less than or equal to the preset similarity threshold as a negative example sample of the target relationship, and summarizing all the negative example samples to obtain the negative example sample set.

3. The method according to claim 2, wherein the similarity score is calculated by the following formula:

$$\text{Score}(h, t) = \|h + r - t\|_{L_2};$$

wherein, Score (h, t) indicates the similarity score of the target entity pair (h, t), and r indicates the target relationship.

4. The method according to claim 2, wherein the re-sampling the negative sample set based on the positive sample set to obtain a target entity relationship pair comprises:

obtaining a correlation relationship of the target relationship in the positive example sample, and replacing the target relationship in the negative example sample corresponding to the positive example sample with the correlation relationship to obtain a replacement entity relationship pair;

calculating a similarity score of the replacement entity relationship pair, and using the replacement entity relationship pair with the similarity score greater than the preset similarity threshold as a positive example sample of the correlation relationship;

using all the positive examples as the target entity relationship pair.

5. The method according to claim 4, wherein after the using the replacement entity relationship pair with the similarity score greater than the preset similarity threshold as a positive example sample of the correlation relationship, the method further comprises:

using the replacement entity relationship pair with the similarity score less than or equal to the preset similarity threshold as a negative example sample of the correlation relationship, and re-sampling the negative example sample of the correlation relationship using the positive example sample of the correlation relationship.

6. An electronic apparatus, wherein the electronic apparatus comprises:

at least one processor; and, a memory in communication with the at least one processor, wherein the memory stores a computer program executable on the at least one processor, and the computer program is executed by the at least one processor to enable the at least one processor to implement:

acquiring a service text set, classifying service texts in the service text set based on text categories of the service texts to obtain a classified text set;

performing entity identification and relationship identification on classified texts in the classified text set to obtain an entity set and a relationship set;

constructing a positive example sample set and a negative example sample set based on the entity set and the relationship set; and re-sampling the negative example sample set based on the positive example sample set to obtain a target entity relationship pair;

wherein the classifying service texts in the service text set based on text categories of the service texts to obtain a classified text set comprises:

traversing the service texts in the service text set and calculating a number of words in each traversed service text;

when the number of the words meets a preset word threshold, determining the corresponding traversed service text as a short text, and classifying the short text using a pre-built short text classification model;

when the number of the words does not meet the preset word threshold, determining the corresponding traversed service text as a long text, and classifying the long text using a pre-built long text classification model; and summarizing all the classified service texts to obtain the classified text set;

wherein the performing entity identification and relationship identification on the classified texts in the classified text set to obtain an entity set and a relationship set comprises:

vectorizing the classified texts in the classified text set using a pre-built BERT model to obtain sentence feature vectors;

performing entity identification and extraction on the sentence feature vectors using a pre-built entity identification model to obtain the entity set;

determining a keyword from the classified texts based on a preset number of entities in the entity set, and determining a relationship between different numbers of entities based on a preset attribute of the keyword, and summarizing all identified relationships to obtain the relationship set.

7. The electronic apparatus according to claim 6, wherein the constructing a positive example sample set and a negative example sample set based on the entity set and the relationship set comprises:

selecting a target relationship from the relationship set, and selecting a target entity pair from the entity set based on the target relationship;

calculating a similarity score of the target entity pair and the target relationship, and using an entity relationship pair formed by the target entity pair and the target relationship with the similarity score greater than a preset similarity threshold as a positive example sample of the target relationship, and summarizing all the positive example samples to obtain the positive example sample set; and using the entity relationship pair formed by target entity pair and the target relationship with the similarity score less than or equal to the preset similarity threshold as a negative example sample of the target relationship, and summarizing all the negative example samples to obtain the negative example sample set.

8. The electronic apparatus according to claim 7, wherein the similarity score is calculated by the following formula:

$$\text{Score}(h, t) = \|h + r - t\|_{L_2};$$

wherein, Score (h, t) indicates the similarity score of the target entity pair (h, t), and r indicates the target relationship.

9. The electronic apparatus according to claim 7, wherein the re-sampling the negative sample set based on the positive sample set to obtain a target entity relationship pair comprises:

obtaining a correlation relationship of the target relationship in the positive example sample, and replacing the target relationship in the negative example sample corresponding to the positive example sample with the correlation relationship to obtain a replacement entity relationship pair;

calculating a similarity score of the replacement entity relationship pair, and using the replacement entity relationship pair with the similarity score greater than the preset similarity threshold as a positive example sample of the correlation relationship;

using all the positive examples as the target entity relationship pair.

10. The electronic apparatus according to claim 9, wherein after the using the replacement entity relationship pair with the similarity score greater than the preset similarity threshold as a positive example sample of the correlation relationship, the method further comprises:

using the replacement entity relationship pair with the similarity score less than or equal to the preset similarity threshold as a negative example sample of the correlation relationship, and re-sampling the negative example sample of the correlation relationship using the positive example sample of the correlation relationship.

11. A non-transitory computer-readable storage medium storing a computer program, which, when being executed by a processor, implements:

acquiring a service text set, classifying service texts in the service text set based on text categories of the service texts to obtain a classified text set;

performing entity identification and relationship identification on classified texts in the classified text set to obtain an entity set and a relationship set;

constructing a positive example sample set and a negative example sample set based on the entity set and the relationship set; and re-sampling the negative example sample set based on the positive example sample set to obtain a target entity relationship pair;

wherein the classifying service texts in the service text set based on text categories of the service texts to obtain a classified text set comprises:

traversing the service texts in the service text set and calculating a number of words in each traversed service text;

when the number of the words meets a preset word threshold, determining the corresponding traversed service text as a short text, and classifying the short text using a pre-built short text classification model;

when the number of the words does not meet the preset word threshold, determining the corresponding traversed service text as a long text, and classifying the long text using a pre-built long text classification model; and summarizing all the classified service texts to obtain the classified text set;

wherein the performing entity identification and relationship identification on the classified texts in the classified text set to obtain an entity set and a relationship set comprises:

vectorizing the classified texts in the classified text set using a pre-built BERT model to obtain sentence feature vectors;

performing entity identification and extraction on the sentence feature vectors using a pre-built entity identification model to obtain the entity set;

determining a keyword from the classified texts based on a preset number of entities in the entity set, and determining a relationship between different numbers of entities based on a preset attribute of the keyword, and summarizing all identified relationships to obtain the relationship set.

12. The non-transitory computer-readable storage medium according to claim 11, wherein the constructing a positive example sample set and a negative example sample set based on the entity set and the relationship set comprises:

selecting a target relationship from the relationship set, and selecting a target entity pair from the entity set based on the target relationship;

calculating a similarity score of the target entity pair and the target relationship, and using an entity relationship pair formed by the target entity pair and the target relationship with the similarity score greater than a preset similarity threshold as a positive example sample of the target relationship, and summarizing all the positive example samples to obtain the positive example sample set; and using the entity relationship pair formed by target entity pair and the target relationship with the similarity score less than or equal to the preset similarity threshold as a negative example sample of the target relationship, and summarizing all the negative example samples to obtain the negative example sample set.

13. The non-transitory computer-readable storage medium according to claim 12, wherein the similarity score is calculated by the following formula:

$$\text{Score}(h, t) = \|h + r - t\|_{L_2};$$

wherein, Score (h, t) indicates the similarity score of the target entity pair (h, t), and r indicates the target relationship.

14. The non-transitory computer-readable storage medium according to claim 12, wherein the re-sampling the negative sample set based on the positive sample set to obtain a target entity relationship pair comprises:

obtaining a correlation relationship of the target relationship in the positive example sample, and replacing the target relationship in the negative example sample corresponding to the positive example sample with the correlation relationship to obtain a replacement entity relationship pair;

calculating a similarity score of the replacement entity relationship pair, and using the replacement entity relationship pair with the similarity score greater than the preset similarity threshold as a positive example sample of the correlation relationship;

using all the positive examples as the target entity relationship pair.

* * * * *